United States Patent [19]

Featherstone

[11] 4,280,402
[45] Jul. 28, 1981

[54] CREPE COOKING MACHINE

[76] Inventor: Garnet I. Featherstone, 12 Mark Dr., San Rafael, Calif. 94903

[21] Appl. No.: 67,602

[22] Filed: Aug. 20, 1979

[51] Int. Cl.³ .......................... A47J 37/10; A21B 1/42
[52] U.S. Cl. ...................................... 99/355; 99/423; 425/335; 426/517
[58] Field of Search ............ 99/355, 423, 353, 443 R, 99/443 C, 427, 448, 431; 118/230; 425/223, 224, 335, 363, 637, 374; 426/496, 517, 502, 389

[56] References Cited

U.S. PATENT DOCUMENTS

| | | | |
|---|---|---|---|
| 2,663,249 | 12/1953 | Epstein | 99/423 |
| 3,345,957 | 10/1967 | Welch | 99/355 |
| 3,489,106 | 1/1970 | Lostanlen | 99/423 |
| 3,543,694 | 12/1970 | Tanguy | 99/423 |
| 3,630,140 | 12/1971 | Marrie | 99/423 |
| 3,829,593 | 8/1974 | Hui | 99/423 |
| 3,961,567 | 6/1976 | Munier | 99/423 |

Primary Examiner—Billy J. Wilhite
Attorney, Agent, or Firm—Melvin R. Stidham

[57] ABSTRACT

A crepe cooking machine including a cylindrical metallic drum with a row of metallic cooking pads around its circumference. Infra-red burners inside the drum are supported on the shaft of the drum by mounting them on a rotary bearing. A tray for batter is supported adjacent the lower quadrant of the drum on the ascending side thereof and a transfer roll rotating therein applies batter to the cooking pads. The tray is supported on a spring-mounted movable platform and a cam follower on the platform rolls along the surface of the drum to maintain the transfer roll a fixed distance from the surface of the pads for uniform crepe thickness. A conveyor driven from the drum and positioned on the descending side thereof receives the cooked crepes.

13 Claims, 4 Drawing Figures

CREPE COOKING MACHINE

BACKGROUND OF THE INVENTION

Crepes and other types of pancakes are generally cooked by hand over a hot griddle, and they do not readily lend themselves to mass production. Previous attempts to cook crepes on a volume basis have generally resulted in crepes which are not of uniform thickness and quality.

OBJECTS OF THE INVENTION

It is an object of this invention to provide a crepe cooking machine which produces crepes of uniform thickness and quality.

It is a further object of this invention to provide a crepe cooking machine which produces crepes at a selected thickness and in a predetermined cooking time.

It is a further object of this invention to provide a crepe cooking machine which is completely automatic in operation.

It is further object of this invention to provide a crepe cooking machine which is simple and reliable in operation.

Other objects and advantages of this invention will become apparent from the description to follow, particularly when read in conjunction with the accompanying drawing.

SUMMARY OF THE INVENTION

In carrying out this invention, I provide a cylindrical metal drum with a coaxial shaft fixed thereto, entirely from one side. The other end of the shaft is rotated in a bearing, and another rotary bearing, which is carried intermediate the ends of the shaft supports infra-red burners. Raised, metallic pads are carried around the circumference of the drum and the pads are interconnected by short tabs. A tray for batter is supported on a platform adjacent to the lower quadrant of the drum on the ascending side thereof. The platform is spring mounted and carries a cam follower which rides along the surface of the pads and tabs to maintain a predetermined spacing between the pads and a transfer roller which rotates in the batter. A mesh conveyor carries crepes away from the drum from near the lower end of the top quadrant on the descending side. The conveyor is driven by the drum to maintain a fixed speed relationship and is of wire mesh to facilitate cooling.

DESCRIPTION OF A PREFERRED EMBODIMENT

Figure 1:
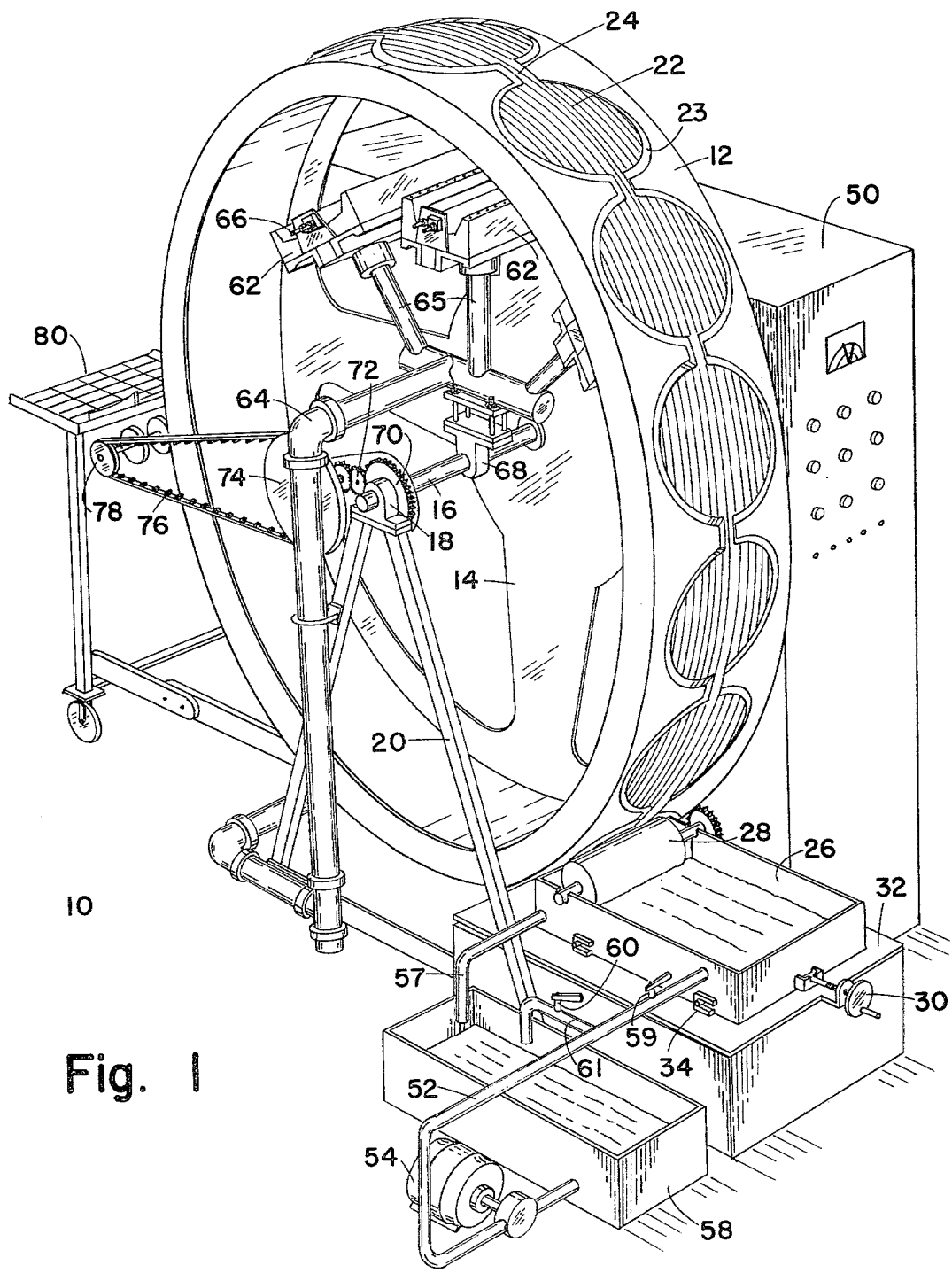
FIG. 1 is a view in perspective of the crepe cooking machine of this invention.

Referring now to FIG. 1 with greater particularity, the crepe cooking machine 10 of this invention includes a metal drum 12 carrying on one side only substantial webs or spokes 14 which support a coaxial shaft 16. The other end of the shaft is rotatably carried in a first rotary bearing 18 supported on a A-frame 20 or the like. Carried around the surface of the drum is a row of raised metallic pads 22, which are beveled at 23 and interconnected by tabs 24, both purposes to be described. The cooking pads 22 and tabs 24 are preferably coated with a suitable material such as Teflon to minimize sticking of the cooked crepes.

A batter tray 26, with a transfer roller 28 rotable therein, is positioned adjacent to the lower quadrant of the drum 12 on the ascending side, with the transfer roller in close proximity to the surface of the pads 22. The precise spacing of the roller 28 is adjusted by means of screw 30 threaded into a nut 36 on the platform 32 to cause the tray 26 to move back and forth in slideways 34 carried on the platform 32.

Figure 3:
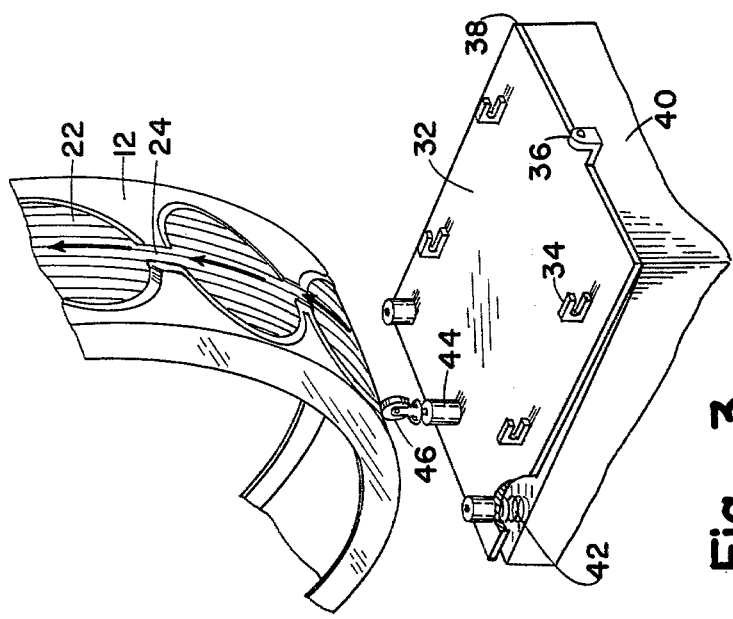
FIG. 3 is a partial view in perspective of cooking drum and batter tray support platform.
Figure 4:
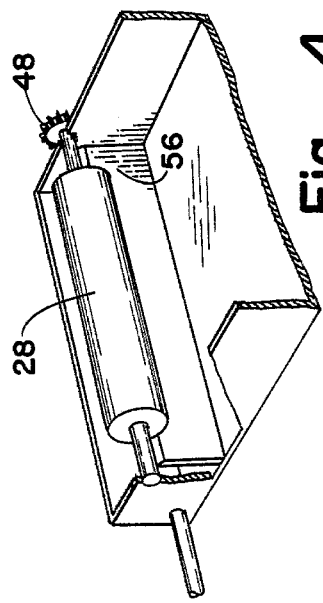
FIG. 4 is a partial view in perspective broken away showing the batter tray.
Figure 2:
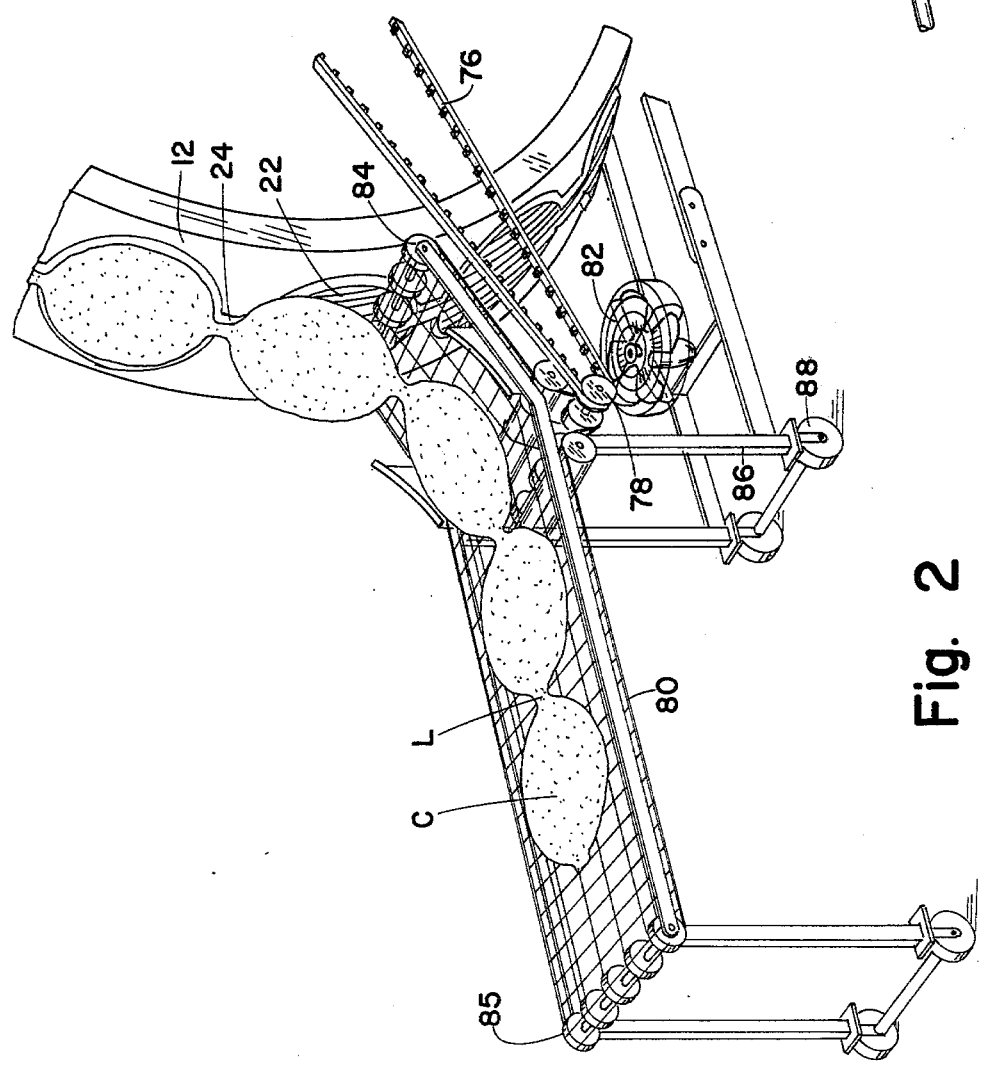
FIG. 2 is a partial view in perspective showing a part of the cooking drum and cooling conveyor.

As shown particularly in FIG. 3, the platform 32 is pivoted at 38 on a base 40 and is spring mounted at 42 at both sides, as indicated, to bias the platform 32 end an upward direction. A cam follower 44 has a roller 46 which rides along the surfaces of the pads 34 and the tab 22 as indicated by the arrows in FIG. 3 thus maintaining the surface of the platform 34 and, hence, the tray 26 and transfer roller 28 a predetermined distance from the surfaces of the pads 22. This insures uniformity of thickness of the batter applied to the cooking pads and, therefore, of the cooked crepes.

The batter is delivered to the tray 26 through a fill tube 52 (FIG. 1) by a pump 54, and any overflow which flows over a weir 56 is returned through a return line 57 to the reservoir 58. In addition, the weir or scraper 56 removes any lumps in the batter from the roller and causes same to be recirculated and agitated by the pump to break them up. Valves 59 and 60 in the fill line and in a by-pass line 61 may be adjusted so that a portion of the batter delivered by the pump 54 is diverted to the reservoir to prevent overflow and to keep the batter in suspension.

The crepes are cooked on the cooking pads 22 by heating the interior surface of the drum 12, as by means of infra-red burners 62 which are disposed adjacent to said interior surface. The infra-red burners are supplied with an air-gas mixture from a source (not shown) through a pipe 64 and branch lines 65. The burners 62 include electric igniters 66 to initiate combustion. The burners are supported within the drum 12 by mounting the pipe 64 on a rotary bearing 68 which, in turn, is supported by the rotating drum shaft 16.

Gears 70 and 72 drive the main sprocket 74 of a timing belt 76 to rotate the sprocket 78 and drive a conveyor belt 80 from the drum shaft 16, which in turn, is driven from the drive center 50 including any suitable drive source, such as electric motor.

The conveyor is preferably of mesh construction as of wire netting to facilitate cooling the crepes C. In addition, I may provide a fan 82 to facilitate cooling and to apply a gentle upward thrust to facilitate separation of the crepes C from the cooking pads 22. The conveyor belt is supported on legs 86 with the receiving end thereof 84 adjacent the drum 12 at or below the lower portion of the top quadrant of the drum on the descending side. The conveyor legs 86 may be provided with wheels 88 to facilitate cleaning and accessibility to the drum 12. Because the conveyor 80 is driven by the drum shaft 16 there is, of course, a fixed relationship between their surface velocities and, preferably the velocity of the conveyor 80 is slightly greater than that of the drum surface 12.

In operation, the igniters 66 are triggered to start the infra-red burners 62 and the rates of rotation of the drum 12 and transfer roller 28 are set by adjustment of suitable controls at the drive center 50. As the drum rotates past the transfer roller, the roller rolls through the batter to pick up a coating thereof and applies it to the cooking pads 22 and tabs 24. The cooking pads then ascend up over the burner 62 with the speed of the drum set to provide the desired cooking time. When the crepes C reach the conveyor 12 they drop off onto the conveyor to be carried away. Because of the tabs 24 interconnecting the cooking pads 22, the crepes are interconnected by small links L of batter cooked on the tabs, with these links, each crepe tends to pull the next succeeding crepe away from the drum 12 to facilitate separation. With the edges of the pads 22 beveled at 23, there is little chance that the crepes will hang up by lips which might be formed by batter dripping down the sides of the pads. At the delivery end 85 of the conveyor 80 the crepes are separated and packed or transported for further operations.

While this invention has been described in conjunction with preferred embodiments thereof, it is obvious that modifications and changes therein may be made by those skilled in the art without departing from the spirit and scope of this invention, as defined by the claims appended hereto.

What is claimed as invention is:

1. A crepe cooking machine comprising:
a generally cylindrical, metallic drum;
a row of generally circular, metallic cooking pads around the circumference of said drum;
a source of heat within said drum adjacent the interior surface thereof;
a container for batter adjacent said drum;
a transfer roller rotatable in said container;
a base;
a support platform movable on said base toward and away from said drum;
biasing means urging said platform towards said drum; and
cam follower means on said platform engaging the outer surface of said drum to maintain a constant spacing therefrom;
said batter container being supported on said platform.

2. The crepe cooking machine defined by claim 1 including:
a plurality of raised tabs on said drum extending between said cooking pads.

3. The crepe cooking machine defined by claim 2 including:
a roller on said cam follower engagable with said pads and said tabs therebetween.

4. The crepe cooking machine defined by claim 1 including:
a conveyor positioned adjacent the descending side of said drum for carrying crepes therefrom; and
means for driving said conveyor from said drum.

5. The crepe cooking machine defined by claim 4 wherein:
said conveyor is a mesh belt, and including:
blower means under said conveyor directed generally tangential to said drum.

6. The crepe cooking machine defined by claim 1 including:

a shaft;
means on one side of said drum supporting said shaft;
a first bearing member beyond the other side of said drum rotatably supporting said shaft;
a second rotary bearing member on said shaft intermediate the length thereof, said second bearing member supporting said source of heat.

7. The crepe cooking machine defined by claim 1 including:
means for adjusting the position of said batter container on said platform toward and away from said drum.

8. The crepe cooking machine defined by claim 1 including:
a reservoir for batter;
a supply conduit from said reservoir to said container;
a pump in said conduit;
a weir across said container; and
an overflow return line from the downstream side of said weir back to said reservoir.

9. The crepe cooking machine defined by claim 8 including:
a by-pass line from said conduit back to said reservoir; and
flow valves in said by-pass line and in said conduit.

10. The crepe cooking machine defined by claim 6 wherein said source of heat comprises:
a gas line supported on said second rotary bearing member;
at least one branch line extending from said gas line; and
a gas burner connected to said branch line and disposed adjacent the interior surface of said drum.

11. A crepe cooking machine comprising:
a generally cylindrical, metallic drum;
a row of generally circular, metallic cooking pads around the circumference of said drum;
a source of heat within said drum adjacent the interior surface thereof;
a container for batter adjacent said drum;
a transfer roller rotatable in said container to transfer batter to said cooking pads; and
a plurality of raised tabs on said drum extending between said cooking pads.

12. The crepe cooking machine defined by claim 11 including:
the circumferential edges of said pads being chamfered.

13. A crepe cooking machine comprising:
a generally cylindrical, metallic drum;
a row of generally circular, metallic cooking pads around the circumference of said drum;
means for applying batter to said pads;
a shaft;
means on one side only of said drum supporting said shaft;
a first bearing member beyond the other side of said drum rotatably supporting said shaft;
a second rotary bearing member on said shaft intermediate the length thereof;
a gas line extending within said drum from beyond said other side;
a gas burner connected to said gas line and disposed adjacent the inner surface of said drum;
means supporting said gas line on said second rotary bearing member.

* * * * *